United States Patent
LaRue

(10) Patent No.: US 7,056,103 B2
(45) Date of Patent: Jun. 6, 2006

(54) METHOD AND APPARATUS FOR COOLING TURBOMACHINERY COMPONENTS

(75) Inventor: Gerald D. LaRue, Torrance, CA (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/795,043

(22) Filed: Mar. 5, 2004

(65) Prior Publication Data

US 2005/0193732 A1    Sep. 8, 2005

(51) Int. Cl.
F04B 17/00 (2006.01)
F01D 1/12 (2006.01)
F03D 7/02 (2006.01)
F02B 33/44 (2006.01)

(52) U.S. Cl. .............. 417/407; 417/406; 417/174; 60/605.1; 415/4.3; 415/58.1

(58) Field of Classification Search ............ 417/407, 417/406, 409, 174; 60/605.1, 605.3; 415/151, 415/144, 58.4, 58.1, 4.3, 203, 206; 210/788
See application file for complete search history.

(56) References Cited

U.S. PATENT DOCUMENTS

| | | | |
|---|---|---|---|
| 2,578,785 A | 12/1951 | Davis ................. | 417/407 |
| 2,646,210 A | 7/1953 | Hans et al. | |
| 3,723,022 A | 3/1973 | Olson ................. | 417/407 |
| 3,734,649 A | 5/1973 | Sandy, Jr. | |
| 3,741,677 A * | 6/1973 | Silvern et al. ........ | 415/58.1 |
| 3,976,390 A * | 8/1976 | Silvern et al. ........ | 415/58.1 |
| 4,170,107 A | 10/1979 | Hansulrich | |
| 4,364,717 A | 12/1982 | Schippers et al. | |
| 4,372,113 A * | 2/1983 | Ramer ................. | 415/144 |
| 4,573,808 A | 3/1986 | Katayama ............. | 415/111 |
| 4,725,206 A | 2/1988 | Glaser et al. ......... | 417/407 |
| 4,756,673 A | 7/1988 | Miyashita et al. ..... | 417/406 |
| 4,786,238 A | 11/1988 | Glaser et al. ......... | 417/407 |
| 4,850,820 A | 7/1989 | Gutknecht ............. | 417/407 |
| 4,859,347 A * | 8/1989 | Simon et al. .......... | 210/788 |
| 5,087,176 A | 2/1992 | Wieland | |
| 5,102,305 A * | 4/1992 | Bescoby et al. ....... | 417/407 |
| 5,309,736 A * | 5/1994 | Kowalski et al. ...... | 417/174 |
| 5,836,738 A * | 11/1998 | Finney ................ | 415/4.3 |
| 5,904,471 A | 5/1999 | Woollenweber et al. .. | 417/371 |
| 6,158,422 A | 12/2000 | Blank et al. | |
| 6,428,268 B1 * | 8/2002 | Addie et al. .......... | 415/206 |
| 6,668,553 B1 | 12/2003 | Ghizawi .............. | 417/407 |
| 2004/0237946 A1 * | 12/2004 | Murakami et al. ...... | 123/520 |

FOREIGN PATENT DOCUMENTS

| | | | | |
|---|---|---|---|---|
| DE | 10040508 A1 * | 2/2002 | | |
| JP | 57005537 A * | 1/1982 | | |
| JP | 58138223 A * | 8/1983 | | |
| JP | 58206825 | 12/1983 | ........... | 417/407 |
| JP | 02294545 A * | 12/1990 | | |
| JP | 2005127307 A * | 5/2005 | | |

* cited by examiner

Primary Examiner—Thai-Ba Trieu
(74) Attorney, Agent, or Firm—Chris James

(57) ABSTRACT

An apparatus and method for cooling components associated with turbomachinery by means of one or more venturis placed in the intake flow of air into the compressor with an air inlet upstream of the venturis and an air outlet integral to at least one venturi. The partial vacuum created from the one or more venturis draws air past components that are desired to be cooled.

14 Claims, 5 Drawing Sheets

METHOD AND APPARATUS FOR COOLING TURBOMACHINERY COMPONENTS

BACKGROUND OF THE INVENTION

1. Field of the Invention (Technical Field)

The present invention relates to methods and devices for cooling turbomachinery components. More particularly, the present invention utilizes one or more venturi devices upstream of the compressor for delivering cooling air to turbomachinery components, such as for cooling airfoil bearings of turbomachinery or motor windings of electric assist turbomachinery.

2. Description of Related Art

Turbomachinery, such as internal combustion engine turbochargers and similar devices, is employed to compress gas using a centrifugal pumping action. Typically turbochargers are powered by the exhaust gas from gasoline or diesel engines, optionally with electric assist motors. The exhaust of these engines is typically routed to the turbine component of the turbocharger directly from the exhaust manifold of the internal combustion engine.

The heating associated with compressing a gas, typically intake air, together with the turbine being powered by hot exhaust gases, results in high operating temperatures for turbochargers. The high temperatures that are continuously endured by the various components of turbomachinery results in decreased operating life of the turbomachinery.

Certain turbochargers are "oil-less" in that they do not employ oiled or greased bearing components. These turbochargers typically employ airfoil bearings adjacent to turbine rotors, the airfoil bearings being gas lubricated. Airfoil bearings require a supply of gas, typically air, to maintain bearing temperature within an optimal range, particularly the desired operational temperature of the foils or elastic materials of the airfoil bearings. Electric assist turbochargers employ an electric motor, including a motor stator, to assist in providing rotational energy for the compressor. The motor stator and associated components is preferably provided with air for cooling. Both airfoil bearings and the motor stator in electric assist turbochargers components are especially at risk of failure at high operating temperatures. The conventional method of providing cooling to these components is to cause some portion of the high-pressure air downstream of the compressor to be made to pass by these components. However, this high-pressure air is at a high temperature due to the heat produced as a result of having just been compressed. Thus a relatively large volume of air must be used to provide sufficient cooling. The use of large volumes of air for cooling purposes reduces the volume of compressed air that is available for use by the engine. This reduction in the volume of air supplied to the engine results in reduced engine performance. There is thus a present need to provide devices and methods cool the components of turbomachinery, particularly airfoil bearings in turbines and motor stators in electric assist turbines, while maintaining the maximum possible volumetric flow of compressed air to the engine.

BRIEF SUMMARY OF THE INVENTION

The invention provides a turbocharger system with a compressor with an air intake flow, a first venturi disposed in the air intake flow, a cooling air inlet disposed in the air intake flow upstream of the venturi and in fluidic connection with a turbocharger component to be cooled, and a cooling air outlet integral to the first venturi and in fluidic connection with the turbocharger component to be cooled. The turbocharger can further include one or more second venturis disposed in the air intake flow downstream of the first venturi. Preferably the one or more second venturis are disposed so as to create a vacuum boosting effect. The fluidic connections, including that between the cooling air inlet and the turbocharger component to be cooled, and between such component and the cooling air outlet integral to the first venturi, can be a duct for directing a cooling air past one or more turbomachine components and returning the cooling air to the first venturi. In one embodiment, the duct includes tubing. The turbocharger can further include a plurality of ducts for directing a cooling air past one or more turbomachine components. The cooling apparatus can also include an engine air filter, preferably wherein the cooling air inlet is disposed in the air intake flow between the engine air filter and the first venturi. In a preferred embodiment, the turbocharger works in a communicable fashion with an internal combustion engine. The turbocharger can include an electrically assisted turbocharger with the component to be cooled including an electric motor stator. Alternatively, the turbocharger component to be cooled can be an airfoil bearing. The turbocharger can be constructed such that the maximum Mach number near the throat of the first venturi is about 0.95, or alternatively such that the maximum Mach number near the throat of the first venturi is about 0.80. In one embodiment, the first venturi includes a converging nozzle and a conical diffuser, with the cooling air outlet disposed therebetween.

The invention further provides a method for cooling a component of a turbocharger. In the method, a turbocharger is provided with a compressor air intake flow. Also provided is an air inlet, located within the compressor air intake flow, in fluidic connection with the component to be cooled. A first venturi is disposed in the air intake flow downstream of the air inlet, the venturi including an air outlet in fluidic connection with the component to be cooled. In the method, the pressure difference between the air inlet and air outlet causes air to flow, thereby cooling the component to be cooled. The method optionally further includes the step of disposing at least one second venturi within the air intake flow and proximate the first venturi. In the method, the component to be cooled can be a turbine airfoil bearing or an electric motor stator of an electric assist turbine. Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The term "turbocharger" is used interchangeably with the term "turbomachinery" throughout the claims and specification, and is intended to include all such similar devices. The turbocharger may be powered solely by exhaust gas of an engine, such as an internal combustion engine, or may be powered, in part or in whole, by other motive means, such as electric assist or electric driven turbochargers. While such turbomachinery can be used in conjunction with numerous devices, it is preferable that the present invention be used in conjunction with diesel and gasoline engines.

The present invention is directed to enhancing the cooling of components related to turbomachinery, such as the airfoil bearings of a turbine or the windings of the electric motor in electrically assisted turbomachinery.

The present invention provides a method for cooling components related to turbomachinery by providing one or more venturis. A venturi is disposed in an air intake flow of a turbomachine, with an air inlet upstream of the venturi in fluidic connection with the component to be cooled and the air outlet return forming a part of the venturi. Fluidic connection may be by means of conventional piping, duct-like structures or the like, provided that the fluidic connection is disposed such that cooling air is provided to the components to be cooled.

The apparatus of the present invention employs one or more venturis upstream of the compressor inlet, and preferably downstream of the air filter, if provided. By means of an intake upstream of the venturi and an outlet within the throat of the venturi, the venturi thus draws ambient air for cooling the desired components of the compressor. This air is preferably made to flow through the foil bearing or motor stator before being returned to the compressor flow.

Figure 1:
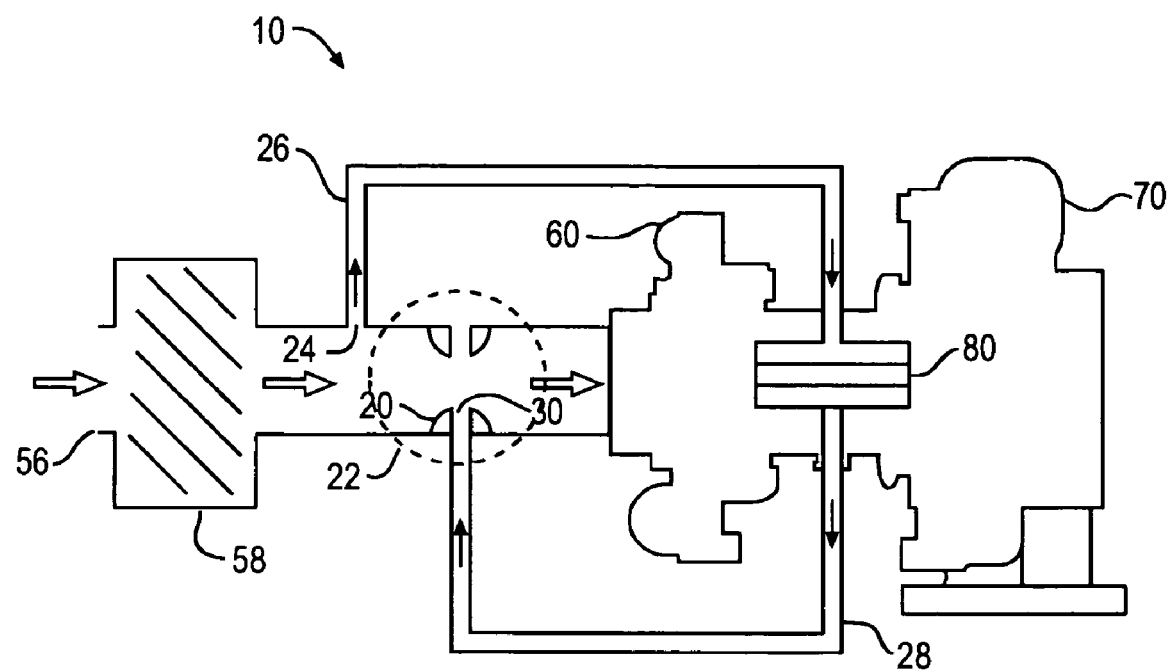
FIG. 1 is a schematic diagram showing the basic operation of an embodiment of the present invention.

Referring to the drawings, FIG. 1 shows turbocharger system 10. System includes inlet 56 and air filter 58, compressor 60, and turbine 70 with airfoil bearing 80. Cooling air inlet 24 is provided downstream of air filter 58, and is connected by means of tubing 26 to airfoil bearing 80, thereby forming a fluidic connection. Airfoil bearing 80 is connected by means of tubing 28 to venturi outlet 30, venturi outlet 30 being disposed within venturi 22, behind converging nozzle 20. As is shown by the air flow arrows, air flows through filter 58, and a portion of the air enters cooling air inlet 24. The remaining portion of the air transits through venturi 22 and is accelerated by converging nozzle 20 to a relatively high speed, thereby resulting in a low pressure, or relative vacuum, zone near the venturi throat formed by converging nozzle 20. The difference in pressure between the inlet 24 flow and the low pressure resulting from the venturi drives a part of the air flow through cooling air inlet 24. The corresponding lower pressure at cooling air outlet 30 causes air to flow through tubing 26, airfoil bearing 80 and through tubing 28. The resulting air flow through venturi outlet 30 then rejoins the primary air flow into the intake air stream of compressor 60.

In an alternative embodiment, rather than tubing 26 being connected to airfoil bearing 80, tubing 26 can be in fluidic connection with another component to be cooled by delivery of ambient air, such as a motor stator on an electric assist turbine.

Figure 2:
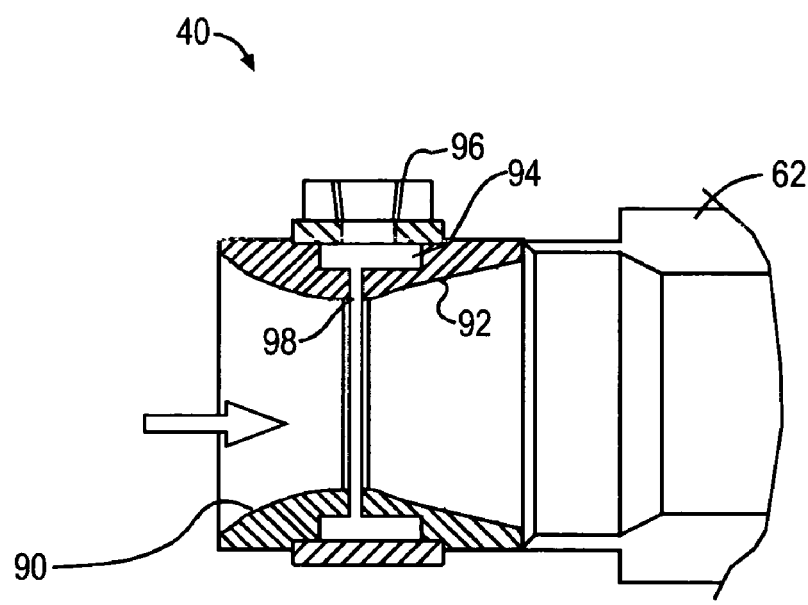
FIG. 2 is a schematic diagram showing a venturi employed in the present invention.

Venturi 40 is shown in FIG. 2, with air flow indicated by the arrow. Venturi 40 includes air inlet plenum chamber 94 in fluidic connection to cooling air outlet fitting 96, provided for connecting a fluidic connection, such as tubing, to the turbomachinery component to be cooled, such as the foil bearing components of an airfoil bearing. Plenum chamber 94 is in fluidic connection with slot 98, provided for delivering cooling air into the throat of venturi 40, it being understood that, in operation, the air pressure at slot 98 is at a negative gage pressure with respect to air flow upstream of venturi 40. Venturi 40 includes, in addition to slot 98, converging nozzle 90 and conical diffuser 92. Venturi 40 is further connected to compressor housing 62.

In one embodiment, venturi 40 is configured, including by means of selection of the shape and slope of converging nozzle 90 and conical diffuser 92, such that the maximum Mach number near the throat of venturi 40 is about 0.95, thereby achieving significant airfoil bearing cooling flow. At a Mach number of 0.95, flow is transonic. Thus the throat diameter and other parameters must be configured such as to prevent flow acceleration to supersonic speeds, potentially resulting in shock wave losses and other deleterious results. Diffuser 92 must be of a significant length in order to achieve efficient diffusion of the air flow at high Mach numbers; alternatively, a small diffuser cone angle may be employed. In a preferred embodiment, the maximum Mach number per the throat of the venturi is thus about 0.95. In another embodiment, the maximum Mach number is about 0.80.

Figure 4:
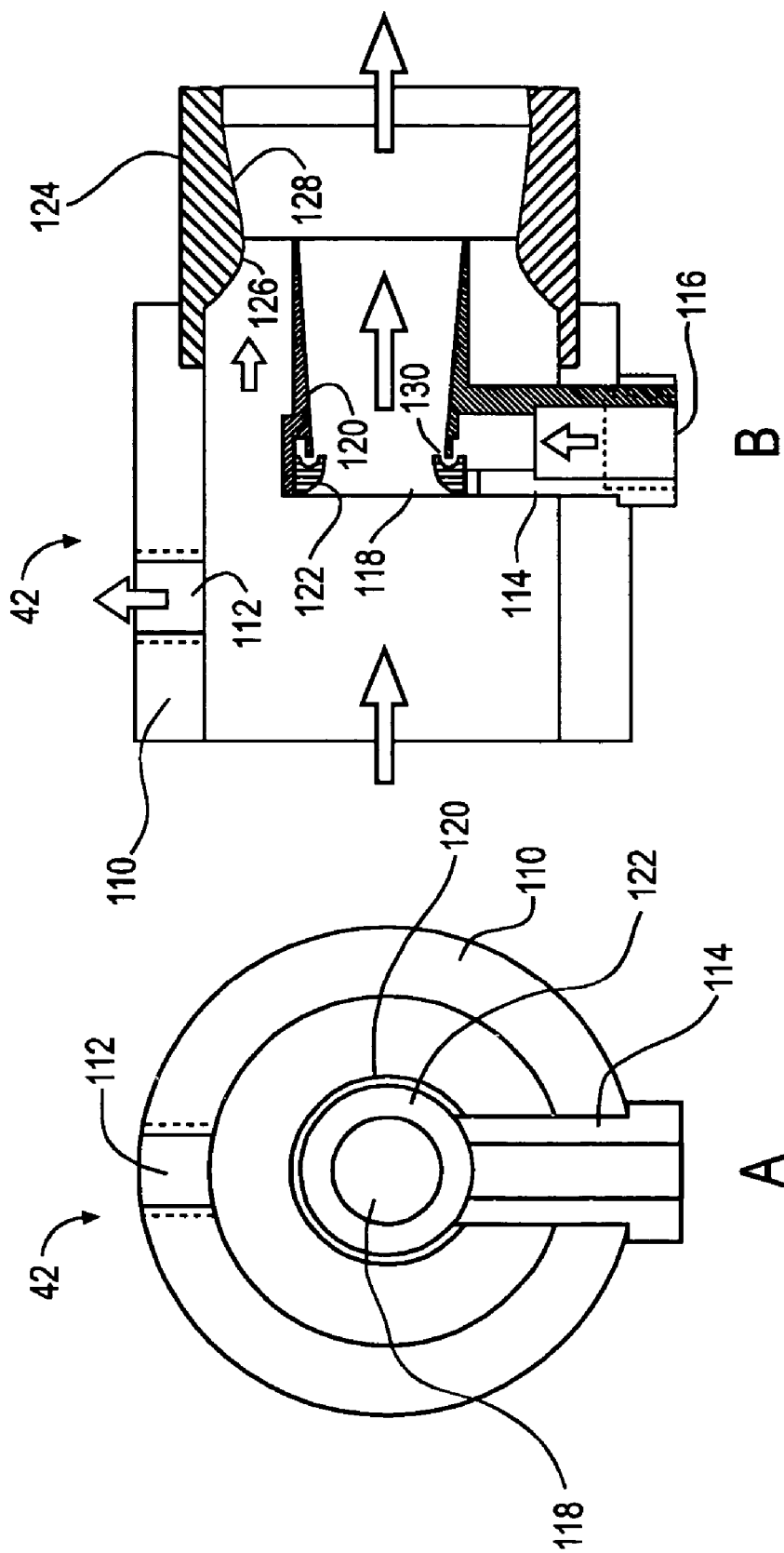
FIGS. 4A and 4B are front and cross-sectional views of an embodiment of the present invention showing the boost venturi in relation to the main venturi.

FIG. 4 depicts dual venturi 42 configuration. Dual venturi 42 is disposed within air intake 110, with cooling air inlet 112 located upstream of dual venturi 42. Boost venturi 118, forming a part of dual venturi 42, includes converging nozzle 122 and conical diffuser 120, with air inlet slot 130 being disposed therebetween. Second or outer venturi 124 is located downstream of boost venturi 118, and comprises converging nozzle 126 and conical diffuser 128. Air flow enters air intake 110, where a portion is diverted through cooling air inlet 112. The air then flows to and optionally through the turbomachinery component to be cooled, such as an airfoil bearing or motor stator, and is returned through cooling air outlet 116 and slot 130. Boost venturi 118 is positioned within the air intake 110 by support strut 114, support strut 114 further including a conduit or passage for return air, providing a fluidic connection between cooling air outlet 116 and slot 130. In one embodiment, the discharge of boost venturi 118 may be a little ahead, at, or behind the throat of venturi 124 depending on the optimized performance of the two venturis. FIG. 4A depicts a front view of the components, while FIG. 4B depicts a cross-section view.

In order to provide the maximum possible vacuum to pull the maximum amount of cooling air through turbomachinery components to be cooled, it is desirable to choke the venturi. However, with a single venturi this limits the amount of flow that can enter the compressor component of the turbomachinery. Use of multiple venturis, such as dual venturi 42, may be employed to maintain sufficient air flow into the compressor while providing a maximum pressure differential. While the embodiment of FIG. 4 depicts a dual venturi, it is to be understood that more than two venturis can be employed in the practice of the invention. Thus it is possible and contemplated to have additional venturis in series to create more flow to the desired components at lower compressor speeds.

Figure 3:
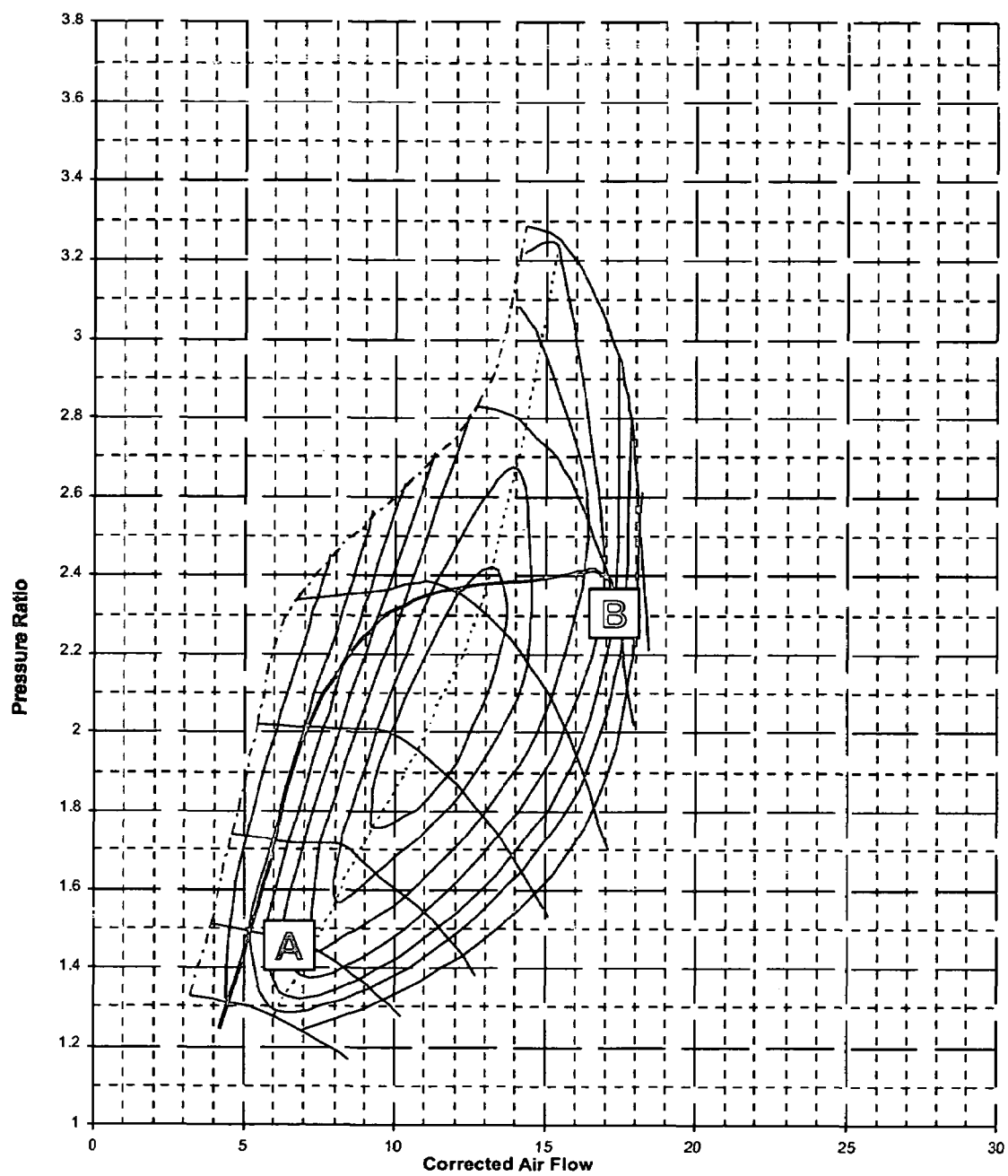
FIG. 3 is a graph depicting the choke point for the booster venturi as well as the maximum engine flow requirement.

In a preferred embodiment venturi 124 is preferably made relatively large. It is preferred that venturi 124 have a maximum throat Mach number of at least about 0.8 at the maximum engine flow requirement, depicted as point B on FIG. 3, a plot of pressure ratio to corrected air flow. Boost venturi 118 is preferably much smaller than venturi 124 and is sized to choke at very low engine speeds, such as point A on FIG. 3.

Since only a portion of the flow preferably goes through boost venturi 118, the restriction of the two venturis is less than that for a single venturi. Choked boost venturi 118 provides the maximum possible vacuum at low engine speeds while venturi 124 ensures minimum restriction at the maximum engine speed.

Figure 5:
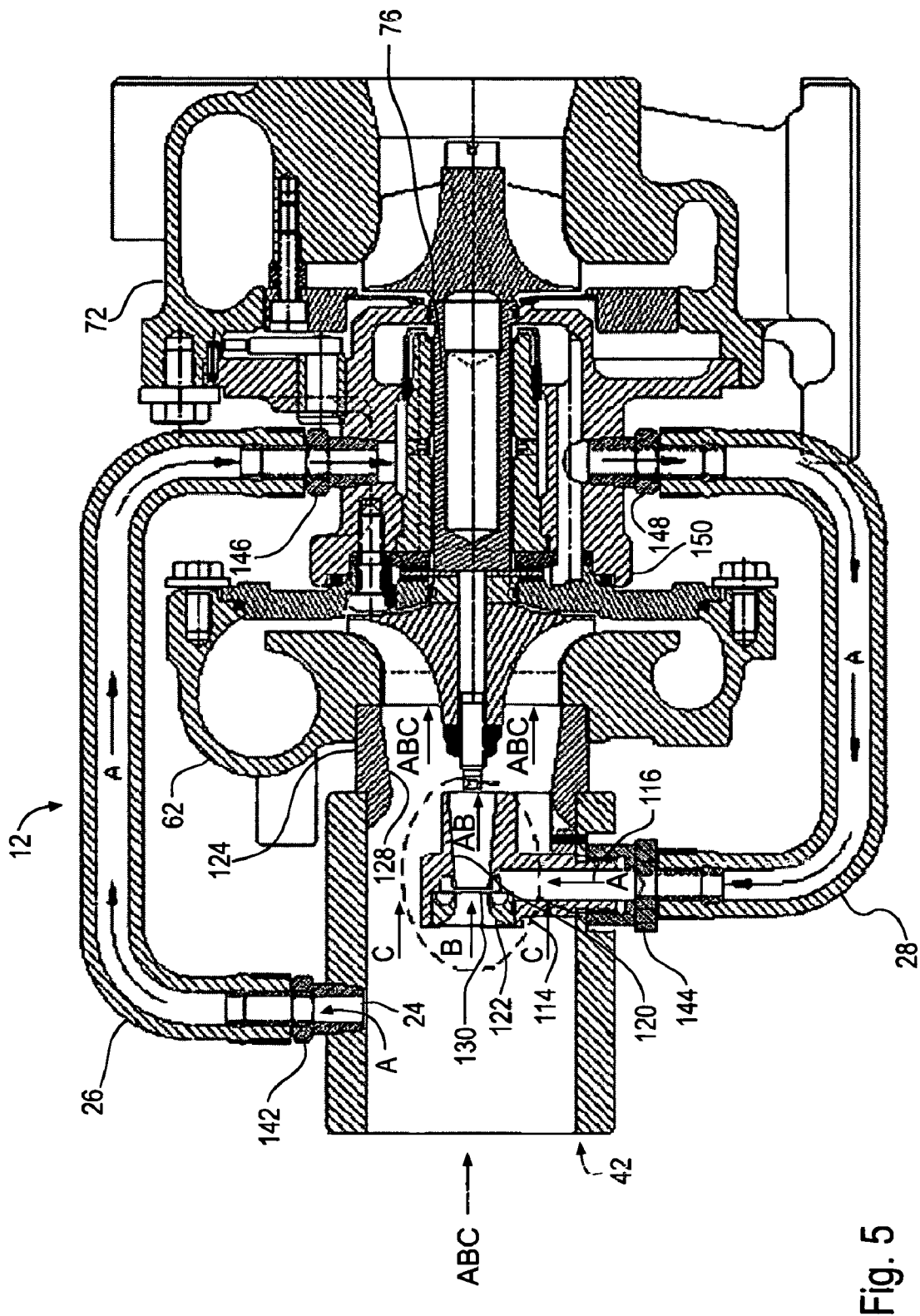
FIG. 5 is a cross-sectional view of a turbocompressor assembly, illustrating a dual venturi embodiment of the present invention for airfoil bearing cooling.

FIG. 5 depicts turbocharger 12 employing dual venturi 42 positioned upstream from compressor 62. Cooling air inlet 24 is connected to tubing 26 by means of fitting 142, which tubing 26 in turn connects to bearing housing 150 by means of fitting 146. A delivered by means of tubing 26 is employed to cool airfoil bearing 76, forming a part of turbine 72, with the cooling air exhausted through tubing 28 connected to bearing housing 150 by means of fitting 148. Tubing 28 is in turn connected to cooling air outlet 116 by means of fitting 144, cooling air outlet 116 forming a part of strut 114. Air exits through slot 130, disposed immediately behind converging nozzle 122. Air flow is indicated by the letters A, B and C; it may be seen that combined air ABC enters the air intake. Portion A of the air is diverted into cooling air inlet 24 by means of a pressure differential between cooling air inlet 24 and the interior throat at slot 130. Portion B of the air enters converging nozzle 122. The exit from diffuser 120 consists of portion B of the air together with portion A, portion A having entered the venturi throat by means of slot 130. The remainder of the air, and generally the largest quantity of air, directly enters venturi 124 as portion C of the air, combining as it enters with air portions A and B.

Portion B of the compressor intake flow is accelerated in converging nozzle 122 to a relatively high speed, resulting in a low-pressure or relative vacuum zone near the venturi throat. The difference in pressure between the intake compressor flow and this low pressure drives portion A of the compressor inlet flow to circulate, such as through the airfoil bearings to provide the intended cooling effect. As portion A is caused to flow through slot 130 of the venturi after cooling the bearings, it mixes with the accelerated nozzle flow B near the flow. To control the amount of flow of portion B entering the boost venturi, the boost venturi is inserted inside outer venturi 124. The boost venturi is preferably aligned such that its exit plane is within or adjacent to the locus of minimum static pressure in venturi 124, which is its throat.

Figure 6:
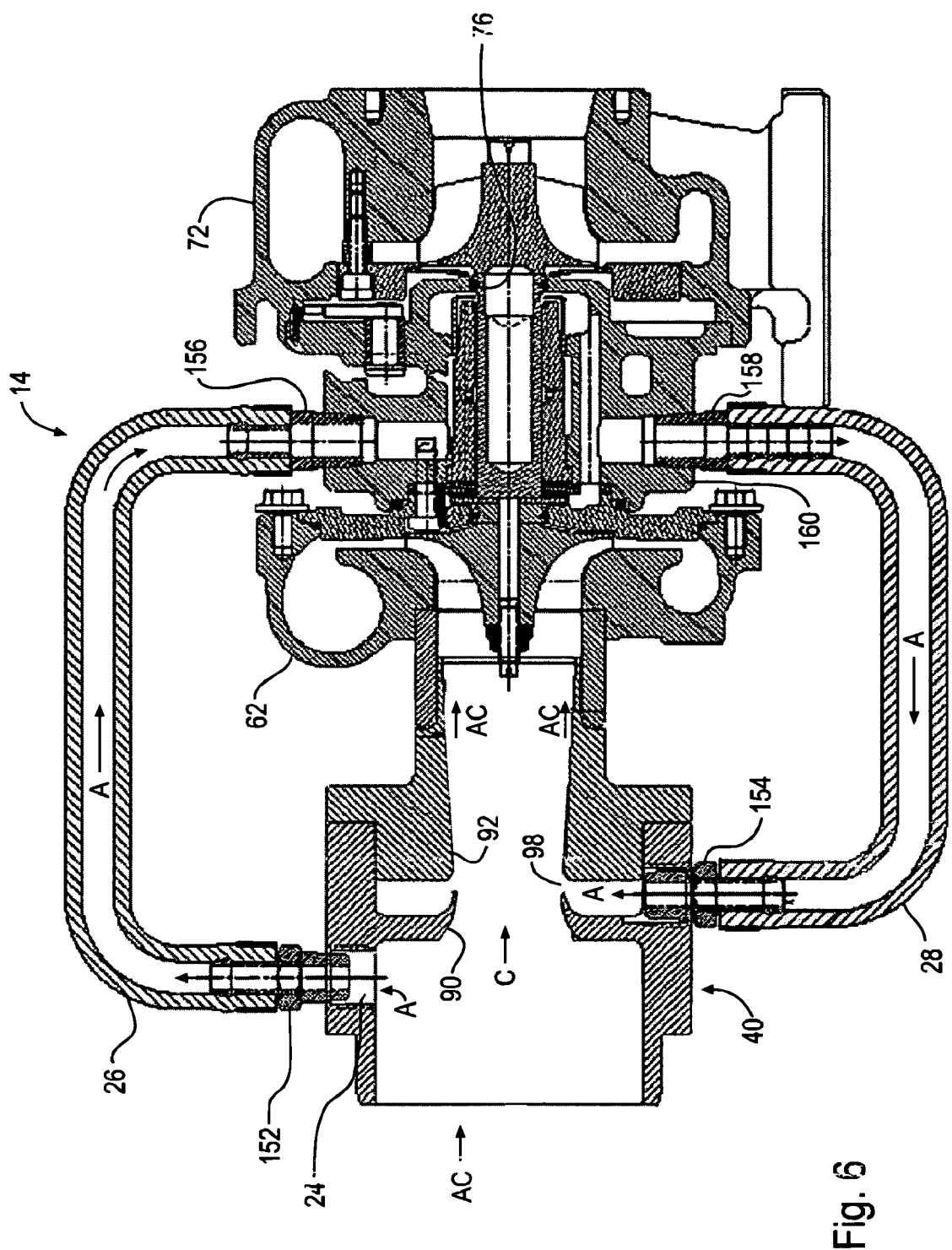
FIG. 6 is a cross-sectional view of a turbocompressor assembly, illustrating a single venturi embodiment of the present invention for airfoil bearing cooling.

FIG. 6 depicts turbocharger 14 employing a single venturi 40 position upstream from compressor 62. Fitting 152 connects cooling air inlet tubing 26, in turn connected by means of fitting 156 to bearing housing 160. Outlet line 28 is connected to housing 160 by means of fitting 158 and to venturi 40 by means of fitting 154. Venturi 40 includes slot 98 disposed between converging nozzle 90 and diffuser 92. Air flow A and C enters venturi 40, with portion A of the air is diverted into tubing 26 by means of a pressure differential between cooling air intake 24 and the interior throat at slot 98. The remainder of the air, and generally the largest quantity of air, directly enters venturi 40 as portion C of the air, combining as it enters with return air portion A.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for cooling a component of a turbocharger, the method comprising the steps of:
   providing a turbocharger compressor with an ambient air intake flow;
   providing a cooling air inlet disposed in the ambient air intake flow to draw a portion of the ambient air and in fluidic connection with the component to be cooled, the component comprising a bearing system, a motor stator, or both;
   disposing a first venturi directly in the ambient air intake flow directly downstream of the air intake so that the first venturi receives a portion of the ambient air, the first venturi comprising a cooling air outlet in fluidic connection with the component to be cooled to receive air coming from the component;
   whereby the pressure difference between the air inlet and air outlet causes air to flow past the component to be cooled.

2. The method of claim 1 further comprising the step of disposing a second venturi within the air intake flow and proximate the first venturi.

3. The method of claim 1, wherein the component to be cooled comprises a turbine airfoil bearing or an electric motor stator of an electric assist turbine.

4. A turbocharger comprising:
   a compressor with an ambient air intake flow;
   a first venturi disposed directly in the ambient air intake flow downstream of the air intake to receive ambient air;
   a cooling air inlet disposed in the ambient air intake flow directly upstream of the first venturi to draw a portion at the ambient air flowing toward the first venturi and in fluidic connection with one or more turbocharger components to be cooled; and
   a cooling air outlet integral to the first venturi and in fluidic connection with the one or more turbocharger components to be cooled to receive air coming from the one or more turbocharger components.

5. The turbocharger of claim 4, further comprising a second venturi disposed in the air intake flow downstream of the first venturi.

6. The turbocharger of claim 5 wherein the second verrturi is disposed so as to create a vacuum boosting effect.

7. The turbocharger of claim 4 wherein the fluidic connections further comprise a duct for directing a cooling air past the one or more turbocharger components and returning the cooling air to the first venturi.

8. The turbocharger of claim 4, further comprising a plurality of ducts for directing a cooling air past the one or more turbocharger components.

9. The turbocharger of claim 4, further comprising an engine air filter, wherein the cooling air inlet is disposed in the air intake flow between the engine air filter and the first venturi.

10. The turbocharger of claim 4 wherein the turbocharger is connected to an internal combustion engine.

11. The turbocharger of claim 4 wherein the turbocharger component to be cooled comprises an airfoil bearing, an electric motor stator, or both.

12. The turbocharger of claim 4 wherein the maximum Mach number near the throat of the first venturi is about 0.95.

13. The turbocharger of claim 4 wherein the maximum Mach number near the throat of the first venturi is about 0.80.

14. The turbocharger of claim 4 wherein the first venturi comprises a converging nozzle and a conical diffuser, with the cooling air outlet disposed therebetween.

* * * * *